Dec. 17, 1957  D. I. SINDELL  2,816,380
DATA CHART
Filed April 25, 1955  2 Sheets-Sheet 1
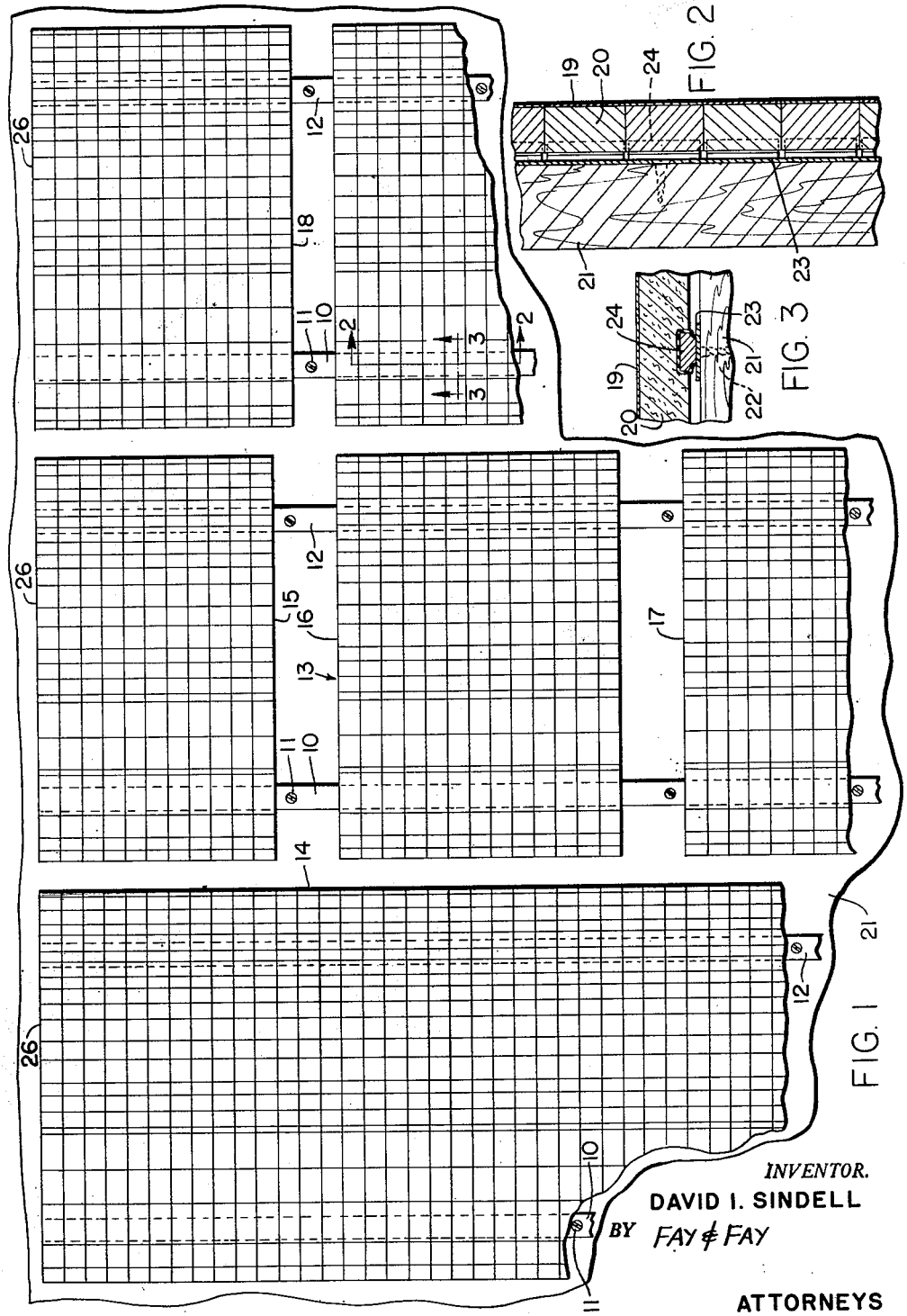
INVENTOR.
DAVID I. SINDELL
BY Fay & Fay
ATTORNEYS Dec. 17, 1957 D. I. SINDELL 2,816,380
DATA CHART
Filed April 25, 1955 2 Sheets-Sheet 2

INVENTOR.
DAVID I. SINDELL
BY FAY & FAY
ATTORNEYS

United States Patent Office 2,816,380
Patented Dec. 17, 1957

2,816,380
DATA CHART

David I. Sindell, Shaker Heights, Ohio

Application April 25, 1955, Serial No. 503,691

3 Claims. (Cl. 40—142)

This invention, relating as indicated to a data chart, is particularly directed to a means for a visual presentation of material in tabular form, as, for example, in production scheduling, or docket charts for lawyers, where scores of related items may be presented conveniently in columnar form. Such chart-type presentation requires constant revision so that the informational data will be accurate and up to the minute at all times for planning, scheduling, conferences, or to follow the regular course of business.

In the past many types of scheduling or docket systems have been available for presenting material in tabular form, but almost always only a single element of data could be presented in order, i. e., if a series of items was dependent upon production or the date on which a certain job was to be done, that fact alone could be presented in order and a completely new chart or new material had to be made out if it became necessary to correlate that showing with another significant related fact or facts. This composite type information has to be readily available to the observer to plan work, check inventory, follow production schedules or the like.

This invention is particularly directed to a magnetic device for presenting data in tabular form so that not only a single element, but multiple elements, of data can be displayed and easily visualized, and such chart may be quickly rearranged or rescheduled as the work is done, discarded or taken off the chart.

An object of this invention is to provide a convenient and easy means for presenting multiple elements of data on a chart in tabular form.

A further object of this invention is to provide a means for presenting indicia, including markers, pins, flags, together with written information on a chart, and have it so that it may be moved readily to any position on the chart and so that the elements of indicia may be replaced, changed or removed as desired.

To the accomplishment of the foregoing and related ends, said invention then consists of the means hereinafter fully described and particularly pointed out in the claims, the following description setting forth in detail one approved method of carrying out the invention, such disclosed method, however, constituting but one of the various ways in which the principles of the invention may be used.

In the drawings:

Fig. 1 is a plan view of this magnetic data chart;

Fig. 2 is a cross-sectional view of Fig. 1 along the lines 2—2 of Fig. 1;

Fig. 3 is a cross-sectional view transverse to Fig. 2 of the magnets and data slats along the line 3—3 of Fig. 1;

Figs. 4a and 4b show a typical example of a heading for a data slat particularly useful for work in connection with an attorney's work docket in an accident and negligence practice;

Figs. 5a and 5b show an example of said slat having examples of specific case numbers and company names in a legal personal injury action.

In the drawings, 10 shows a vertically extending backing element of a magnetic material, such as a soft iron rail or plate, possibly coated with a corrosion resistant material, such as a cadmium plate, having mounting means therefor, such as screws, shown at 11. Another parallel backing rail or strip is shown at 12. The data slats may be shown collectively as at 13 and they are mounted parallel below one another. They may be divided up into segments for classification purposes for study and analysis, as, for example, the material presented on the left panel at 14, the top panel in the center portion at 15, the middle portion of said panel 16, the lower portion 17, and the upper portion of the right-hand panel 18.

In connection with details of said slats and said mounting means, Fig. 2 shows a cross section of a number of these data slats. The slats comprise an outer layer of paper, parchment or the like, as at 19, secured as by means of tapes, pins or the like to a soft board 20 of fibrous material, plastic, or the like, having some inherent rigidity. The backing material may be of any material 21 adapted to have mounting means, screws or the like fastened therein as at 22. The rail or plate itself is shown at 23 and the magnets are seen at 24.

Shown more particularly in connection with Fig. 3 are the details for mounting the data slats and magnets. A small channel member is used for holding the magnets, although other means for mounting directly upon the soft fibrous material 20 may be employed. Said magnets are secured as with an adhesive at the back of the magnet and preferably project outwardly from the channel beyond the surface of the slat. The magnets are mounted in each data slat perpendicular to the strip and adapted to register with the magnetic material of the vertical mounting elements. Said magnets are, of course, of a permanent type.

At the top of each chart, as for example at 26, would be a heading, shown more particularly in connection with Figs. 4a and 4b, though, of course, this would be adaptable for inventory control, production scheduling, or any other type of data presentation. In these Figs. 4a and 4b, it will be seen that the slat 20 has mounted on the outer surface a covering adaptable for marking, such as a thick cardboard paper, and these papers could be colored, as for example red, blue, green and yellow, to indicate the type of material that is docketed. For instance, one part of the chart, shown more particularly in connection with Fig. 1, might be blue indicating a particular type of legal case, another might be yellow indicating another type of action, for convenience in follow-up and in scheduling work.

In connection with the specific example to be enumerated more in detail, it will be seen that in an attorney's negligence practice a Federal district court case might involve one set of procedures and time sequences indicated by blue chart elements, for example, as distinguished from State court actions involving a municipal bus system, which would be perhaps yellow, and with the more numerous general type of tort action being shown in some other color. Each case would have a heading, such as is indicated here in Figs. 4a and 4b, and on the left-hand side would be an outlined block adaptable for carrying an attorney's name, pin or color so that his cases can be readily distinguished from those of other attorneys in the firm. The number of the case would be in the second column and immediately below this, as seen in Fig. 5a is an example of a specific case number. The name of the case would be in the next block, the tort, and the name and address of the tortfeasor. The next block might be filled with the type of plaintiff and pins, indicia, or other markings could be used to indicate various kinds of plaintiffs. There would be other blocks available for indicating the insurance company, the defendant's firm of counsel, the specific name of the counsel perhaps, the date of the tort, the pertinent statute of limitation date, and the filing date of the case. The defendant's requests for leave to plead would be shown in a separate block and the number of times these requests were acquiesced in by the plaintiff might also be indicated.

The chart data described above is illustrative of a docket chart that may be used by a law firm having a considerable practice as plaintiffs' counsel in negligence cases. The blocks set out on the longitudinal strip may have in them a number of different indicia, as for example, little metallic flags mounted in any of these blocks to indicate that some type of action is necessary. In particular, in connection with a defendant's leave to plead, each time a leave to plead is filed a pin would be put in the correct block so that as time goes on, after a certain number of leaves to plead, special action could be taken. When the plaintiff's deposition is taken, there is a separate block to indicate same, as well as a block to indicate when the defendant's deposition is taken, when the defendant's medical evidence is ready, and other material, including whether the case is up for pre-trial, the date of the pre-trial, and additional information. There might be a flag to indicate that the case has been evaluated by office conference as to possible settlement figures.

This is only a particular example of its use in one form, but it will be easily seen that a great variety of information, type and quantity, can be installed on one data slat and that said slat can be arranged and rescheduled and easily moved on a scheduling chart and that attorneys with completely different interests can check various points as to their particular cases, as to times they have to take certain action, as to the next action they must take in any particular matter, and these may be crosschecked by docket clerks who may remind the attorneys of the necessary action. The information on these charts is just as adaptable to scheduling of production, inventory control, salesmen, performance records and the like.

It is important to note, however, that some elements of the chart are of particular importance and that is that the outer slat is adaptable for presentation of various types of indicia, including marking, pins, flags and the like, that the slat is of porous construction and adaptable to these indicia, that the back of the slat has on it a plurality of magnets adapted to register with a plurality of vertical rails or plates of magnetic material and that a multiplicity of said data slats may be mounted or employed together to present data in a convenient tabular form and then rearranged or rescheduled as necessary. The case then can be put on one section of the board to indicate that it is about to be filed and another section of the board when it is filed and is being prosecuted and on a third section of the board when it is in conference for settlement and for the necessary accounting details, i. e., each operation that is necessary can be followed by the persons that are in charge of the work.

This invention also relates to a method of presenting data in tabular form for scheduling adjustments and the like. Invention also resides in the construction of the slats for said chart. Although the present invention in a magnetic data chart has been described in connection with a few preferred embodiments thereof, variations and modifications may be resorted to by those who are skilled in the art of presenting data without departing from the principle of the invention. All of these variations and modifications are considered to be within the true spirit and scope of the present invention as disclosed in the foregoing description and defined by the appended claims.

I claim:

1. A magnetic chart comprising a plurality of rails of magnetizable material and a multiplicity of data slats substantially perpendicular thereto, each of said slats comprising a semi-rigid strip of porous material having secured to the rear side thereof permanent magnets at the same spacing as the interval between the strips of magnetizable material, the front face of said slats having secured thereto indicia in some prearranged manner and adapted for securing pins, flags, marks and other indicia thereto.

2. A composite data chart comprising a plurality of rigidly mounted, parallel, spaced apart plates of magnetic material, and a plurality of data carrying slats having in one surface thereof at least two permanent type magnets, the magnets being spaced apart in the slats so they are adapted to register with each of said plates and to hold the said slats in magnetized perpendicular relationship thereto, the side of each of said slats opposite to that carrying the said magnets having thereon a series of blocks formed by spaced lines extending parallel to the longitudinal axis of the plates, said data carrying slats being movable relative to one another on the said plates.

3. A composite data chart of the type described in claim 2 in which the data presenting slats are further defined as comprising an elongated piece of stiff, semi-porous material having attached to it on the side opposite the magnets, a detachably secured indicia cover, the said indicia cover and strip material being adapted to receive and hold therein pins, markers and the like.

References Cited in the file of this patent

UNITED STATES PATENTS

| | | |
|---|---|---|
| 1,504,709 | Powell | Aug. 12, 1924 |
| 1,694,639 | Brown | Dec. 11, 1928 |
| 1,831,287 | Clark | Apr. 26, 1932 |
| 1,855,287 | Gillespie | Apr. 26, 1932 |
| 2,775,832 | Vizza | Jan. 1, 1957 |

FOREIGN PATENTS

| | | |
|---|---|---|
| 43,704 | France | May 14, 1934 |
| 891,296 | France | Dec. 11, 1943 |